(12) United States Patent
Chaudhuri et al.

(10) Patent No.: US 6,842,753 B2
(45) Date of Patent: Jan. 11, 2005

(54) SAMPLING FOR AGGREGATION QUERIES

(75) Inventors: Surajit Chaudhuri, Redmond, WA (US); Vivek R. Narasayya, Redmond, WA (US); Rajeev Motwani, Palo Alto, CA (US); Mayur D. Datar, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 09/759,799

(22) Filed: Jan. 12, 2001

(65) Prior Publication Data

US 2002/0124001 A1 Sep. 5, 2002

(51) Int. Cl.[7] .............................................. G06F 17/30

(52) U.S. Cl. ............................. 707/10; 707/2; 707/101

(58) Field of Search .............................. 707/2, 3, 5, 10, 707/100, 102, 1, 6, 101, 4; 706/45, 62; 714/25; 702/97

(56) References Cited

U.S. PATENT DOCUMENTS

| | | | | |
|---|---|---|---|---|
| 5,263,120 A | * | 11/1993 | Bickel ........................... | 706/62 |
| 5,483,636 A | * | 1/1996 | Saxena .......................... | 714/25 |
| 5,799,301 A | * | 8/1998 | Castelli et al. .................. | 707/6 |
| 5,809,491 A | * | 9/1998 | Kayalioglu et al. ............ | 706/45 |
| 5,946,692 A | * | 8/1999 | Faloutsos et al. ............. | 707/101 |
| 6,094,651 A | * | 7/2000 | Agrawal et al. ................ | 707/5 |
| 2002/0123979 A1 | | 9/2002 | Chaudhuri et al. | |
| 2002/0127529 A1 | * | 9/2002 | Cassuto et al. .............. | 434/335 |

OTHER PUBLICATIONS

S. Acharya, P.B. Gibbons, V. Poosala, "Congressional Samples for Approximate Answering of Group–By Queries", ACM SIGMOD 2000, May 2000, Dallas, Texas.

S. Acharya, P.B. Gibbons, V. Poosala and S. Ramaswamy, "Join Synopses for Approximate Query Answering", SIGMOD 1999, Philadelphia, PA.

P.B. Gibbons and Y. Matias, "New Samping–Based Summary Statistics for Improving Approximate Query Answers", SIGMOD 1998, Seattle, WA.

P.J. Haas and J.M. Hellerstein, "Ripple Joins for Online Aggregation", SIGMOD 1999, Philadelphia, PA.

S. Chaudhuri, R.Motwani and V. Narasayya, "On Random Sampling Over Joins", SIGMOD 1999, Philadelphia, PA.

G.S. Manku, S. Rajagopalan, B.G. Lindsay, "Random Sampling Techniques for Space Efficient Online Computation of Order Statistics of Large Datasets", SIGMOD 1999, Philadelphia, PA.

(List continued on next page.)

*Primary Examiner*—Shahid Alam
(74) *Attorney, Agent, or Firm*—Microsoft Corporation

(57) ABSTRACT

Aggregation queries are performed by first identifying outlier values, aggregating the outlier values, and sampling the remaining data after pruning the outlier values. The sampled data is extrapolated and added to the aggregated outlier values to provide an estimate for each aggregation query. Outlier values are identified by selecting values outside of a selected sliding window of data having the lowest variance. An index is created for the outlier values. The outlier data is removed from the window of data, and separately aggregated. The remaining data without the outliers is then sampled in one of many known ways to provide a statistically relevant sample that is then aggregated and extrapolated to provide an estimate for the remaining data. This sampled estimate is combined with the outlier aggregate to form an estimate for the entire set of data. Further methods involve the use of weighted sampling and weighted selection of outlier values for low selectivity queries, or queries having group by.

26 Claims, 7 Drawing Sheets

OTHER PUBLICATIONS

S. Ganguly, P.B. Gibbons, Y. Matias and A. Silberschatz, "Bifocal Sampling for Skew–Resistant Join Size Estimation", pp. 271–281, SIGMOD '96, Jun. 1996, Montreal Canada.

G.K. Ziph, PhD, "Human Behavior and The Principle of Least Effort", 1949, Addison–Wesley Press, Inc.

P.J. Hass, J.F. Naughton and A.N. Swami, "On the Relative Cost of Sampling for Join Selectivity Estimation", pp. 14–24, SIGMOD/PODS 94—May 1994, Minneapolis, Minnesota USA.

J.M. Hellerstein, P.J. Haas and H.J. Wang, "Online Aggregation", pp. 171–182, SIGMOD '97 AZ, USA.

R.J. Lipton, Jeffrey F. Naughton, D.A. Schneider and S. Seshadri, "Efficient Sampling Strategies for Relational Database Operations", Theoretical Computer Science 116 (1993) 195–226.

Wen–Chi Hou, G. Ozaoyoglu and E. Dogdu, "Error–Constrained COUNT Query Evaluation in Relational Databases", pp. 278–287, May 29–31, 1991, Denver, Colorado, Proceedings of the 1991 ACM SIGMOD International Conference on Management of Data.

F. Olken and D. Rotem, "Random Sampling from Databases—A Survey", Abstract and pp. 1–55, Mar. 22, 1994.

R. Motwani and P. Raghavan, "Randomized Algorithms", 1995.

F. Olken, "Simple Random Sampling from Relational Databases", Proceedings from Twelfth International Conference on Very Large Databases, Kyoto, Aug. 1986, pp. 160–169.

G. Piatetsky–Shapiro and C. Connell, "Accurate Estimation of the Number of Tuples Satisfying a Condition", pp. 256–276, 1984 ACM.

S. Chaudhuri, R. Motwani and V. Narasayya, "Random Sampling for Histogram Construction: How much is enough", 12 pages.

G.S. Manku, S. Rajagopalan and B.G. Lindsay, "Approximate Medians and other Quantiles in One Pass and with Limited Memory", pp. 426–435, SIGMOD '98, Seattle Washington.

F.Olken, "Random Sampling from Databases", 1993, pp. 1–158.

S. Chaudhuri and V. Narasayya, Program for TPC–D Data Generation with Skew. ftp.research.microsoft.com/pub/users/viveknar/tpcdskew.

H. Jagdish, N. Koudas and S. Muthukrishnan , "Mining Deviants in Times Series Database", In Proceedings of $25^{th}$ International Conference Very Large Data Bases, pp. 102–113, 1999.

E. Knorr and R. Ng, "Algorithms for Mining Distance–Based Outliers in Large Datasets", In Proceedings of $24^{th}$ International Conference Very Large Data Bases, pp. 392–403, 1998.

J.F. Naughton and S. Seshadri, "On Estimating the Size of Projections", In Proceedings Third International Conference on Database Theory, pp. 499–513, 1990.

W.G. Cochran, "Sampling Techniques", John Wiley & Sons, New York, third edition, 1977, Chapter 3, pp. 50–71.

Y. Ioannidis and V. Poosala, "Histogram Based Approximations of Set–Valued Query Answers", In Proceedings of $25^{th}$ International Conference Very Large Data Bases, pp. 174–185, 1999.

V. Ganti, M.L. Lee and R. Ramakrishnan, "ICICLES: Self–Tuning Samples for Approximate Query Answering", In Proc. $26^{th}$ VLDB, 2000.

Barnett et al., "Outliers in Statistical Data," John Wiley, 3rd Edition, Table of Contents (1994).

Chatfield, "The Analysis of Time Series," Chapman and Hall, Table of Contents (1984).

Hawkins, "Identification of Outliers," Chapman and Hall, Table of Contents (1980).

Etzion, et al., "Temporal Databases: Research and Practice INCS 1399," Springer Verlag, Table of Contents (1998).

Gray et al., "Transaction Processor: Concepts and Techniques," Morgan Kaufmann, Table of Content (1993).

* cited by examiner

SAMPLING FOR AGGREGATION QUERIES

FIELD OF THE INVENTION

This invention relates generally to the field of computers, and in particular to improving sampling techniques for more accurate estimations of queries of large databases.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ® 2000, Microsoft Corporation, All Rights Reserved.

BACKGROUND

Decision support applications such as On Line Analytical Processing (OLAP) and data mining tools for analyzing large databases are gaining popularity. Many databases are growing larger and larger, making it difficult for application programs and computers to search them in their entirety for each request for data, or query, by a user. This is particularly true when the number of users desiring data from the same database is also increasing.

Executing such applications on large volumes of data can also be resource intensive. Fortunately though, samples of the results of queries to the database back end can be used to enhance the scalability of application servers without compromising the quality of their analysis. In other words, only portions or samples of the database are used to provide an estimate of results without scanning the entire database.

Typical decision-support applications use a structured query language (SQL) database system as the backend data warehouse and communicate data retrieval requests via relational SQL queries. On a large database, the cost of executing such queries against the relational backend can be expensive. Therefore, the ability of the application servers to work with samples raises the question of whether a database server can compute a sample of answers to queries without paying the cost of executing the entire query. Such functionality would also enable the database servers to scale efficiently. No matter how many records are in the database, only a statistically relevant sample of them would need to be checked to provide a fairly accurate estimation.

Data mining and statistical analysis involve techniques that can be robust and effective even when supplied with merely a sample of query results. Likewise, OLAP servers that answer queries involving aggregation (performing some function on the results to arrive at an answer, e.g., finding the average) can significantly benefit from the ability to present to the user an approximate aggregate computed from a sample of the subset of the multidimensional data the user is interested in analyzing.

It is important to recognize that sampling must be supported on the result of ad-hoc SQL queries, not just on stored relations. There are several reasons for such a requirement. First, applications need to analyze ad-hoc fragments of data, driven by user requirements, e.g., sales data for a certain time period or sales data for a certain product. Next, great scalability benefits may accrue from speeding-up queries that are expensive to compute in their entirety (complex SQL queries). Such queries typically involve foreign key joins, selections and group by.

Although there has been a wealth of work in databases on supporting sampling, no previous work has carefully examined the practicality of sampling techniques for ad-hoc queries over arbitrary databases. Approximate query answering has recently received a lot of attention, particularly in the context of Data Warehousing. Since most queries in the warehousing application involve aggregation, there, is a need to ensure that approximately answering aggregation queries using sampling provides good results.

Sampling performs poorly when the distribution of the aggregated attribute is skewed. In other words, if some values are very high or very low compared to the rest of the values, sampling of the data might not find those "outlier" values, which could greatly affect the result obtained. Such a database is said to exhibit data skew. Sampling is also hard to use effectively in queries with low selectivity.

The potential effect of outlier values is illustrated by looking at a small database of six records. The values to be aggregated are 1, 2, 1, 4, 3, and 1000. The sampling of these values is based on looking at every other record. The values obtained from this data given the sampling used are 1, 1, and 3. If trying to estimate an average, it is clear that the estimation will be far from the real answer because the value of 1000 was not included in the results. Perhaps the numbers represent sales results from various locations. If trying to estimate total sales, the estimate will be far to low.

There are many other examples of how outlier values can dramatically affect the results of sampling a database. One example involves 10,000 tuples of which 99% have value 1 in the aggregate column, while the remaining 1% of the tuples are of value 1000. Consider using a uniform random sample of size 100 to estimate the average value of the column over all tuples. It is quite likely that the sample would not include any tuple of value 1000, leading to an estimate of 1 for the average value. On the other hand, if perchance two or more tuples of value 1000 were to be included in the sample, then the estimate of the average value would be more than 20.98. In either case, the estimate would be far from the true value of the actual average, 10.99. It is only in the case where exactly one tuple of value 1000 is in the sample that a reasonable estimate of the average value would be obtained. But the latter event has probability 0.37, therefore there is high probability that a large error in the estimate would result.

In this example it is observed that a skewed database is characterized by the existence of certain tuples that are deviant from the rest with respect to their aggregate value. These are referred to as outliers. It should be noted that the presence of these tuples in the wrong proportion in the sample would also lead to large errors in the estimate of a query's result.

There are many examples one could provide to justify that indeed such skew exists in databases. Consider a database that maintains the population for different countries. The population figures for countries like China and India are surely deviant from the figures for the remaining countries and lead to a skew. Suppose a database maintained nationwide sales figures for a range of items ranging from a particular luxury model of automobile to six-packs of soda pop. While the sales figures for the automobile model would be very small, the sales figures for Coke could range in the millions. One potential solution to the problem involves greatly increasing the sample size. Greatly increasing the sample size results in losing the very benefit that sampling provides. It requires more system resources and takes more time.

There is a need to properly account for such outlier values without significantly affecting the speed and scalability benefits provided by sampling.

Low selectivity of queries can also contribute to significant error in approximation of aggregate values. No single sample of the database can answer all queries with low selectivity with sufficient accuracy. Most queries involve selection conditions or Group-By's. If the selectivity is low, then it dramatically and adversely impacts the accuracy of sampling-based estimation. Selection queries partition the relation into two sub-relations: tuples that satisfy the condition (relevant sub-relation) and those which do not. Sampling in a uniform manner results in the number of tuples that are sampled from the relevant sub-relation being proportional to its size. If the number is low, a very small relevant sample results, leading to large error. The same is true for Group-By queries which partition the relation into numerous sub-relations (tuples that belong to specific groups).

There is also a need for an accurate way to estimate the results of queries, such as an aggregation of queries having selection conditions and Group-By's. There is a need for such a way that does not greatly increase sample sizes, and retains the benefits that sampling provides for databases having data skew and low selectivity.

SUMMARY OF THE INVENTION

Estimating aggregation queries on skewed data is performed by first identifying outlier values and aggregating the outlier values. A sample of non-outlier values is then aggregated. The aggregate of the sampled values is scaled and added to the aggregated outlier values to provide an estimate for each aggregation query.

Outlier values are identified by an index. The number of values in the outlier index is based on an amount of user allocated memory for the index. This amount of memory defines the size of a contiguous window. The window is moved across all values in the database, and the variance of values for the window is calculated for each window position. The window with the smallest variance is used to define the tuples, having non-outlier values, of the database to be sampled. The values outside the window having minimum variance are defined as the outlier values. The index on such values provides a quick way to access them for further processing.

The outlier data is indexed to allow for faster identification in real time in response to queries of the data. When a query is issued by a user covering data for which outlier data has been identified, the outlier data is first identified, and separately aggregated in totality. The remaining data, the non-outlier values are then sampled in one of many known ways, such as randomly, or by selecting every Nth value, where N is large enough to provide a statistically relevant sample, and small enough not to require an undesired amount of system resources. The sample is then aggregated and extrapolated to provide an estimate for the remaining data. This sampled estimate is combined with the outlier aggregate to form an estimate for the entire set of data.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system that implements the current invention. This is followed by a description of the problems of sampling when the data being sampled exhibits data skew or low selectivity, and a high level description of how aggregate queries are estimated using a combination of outlier identification and sampling. Further detail regarding the identification of outlier data, the sampling techniques and how data from outliers and sampling are combined is then described. One further section provides detail regarding the exploitation of workload information for queries with selection and group by. This is followed by a conclusion which describes some potential benefits and describes further alternative embodiments.

Hardware and Operating Environment

Figure 1:
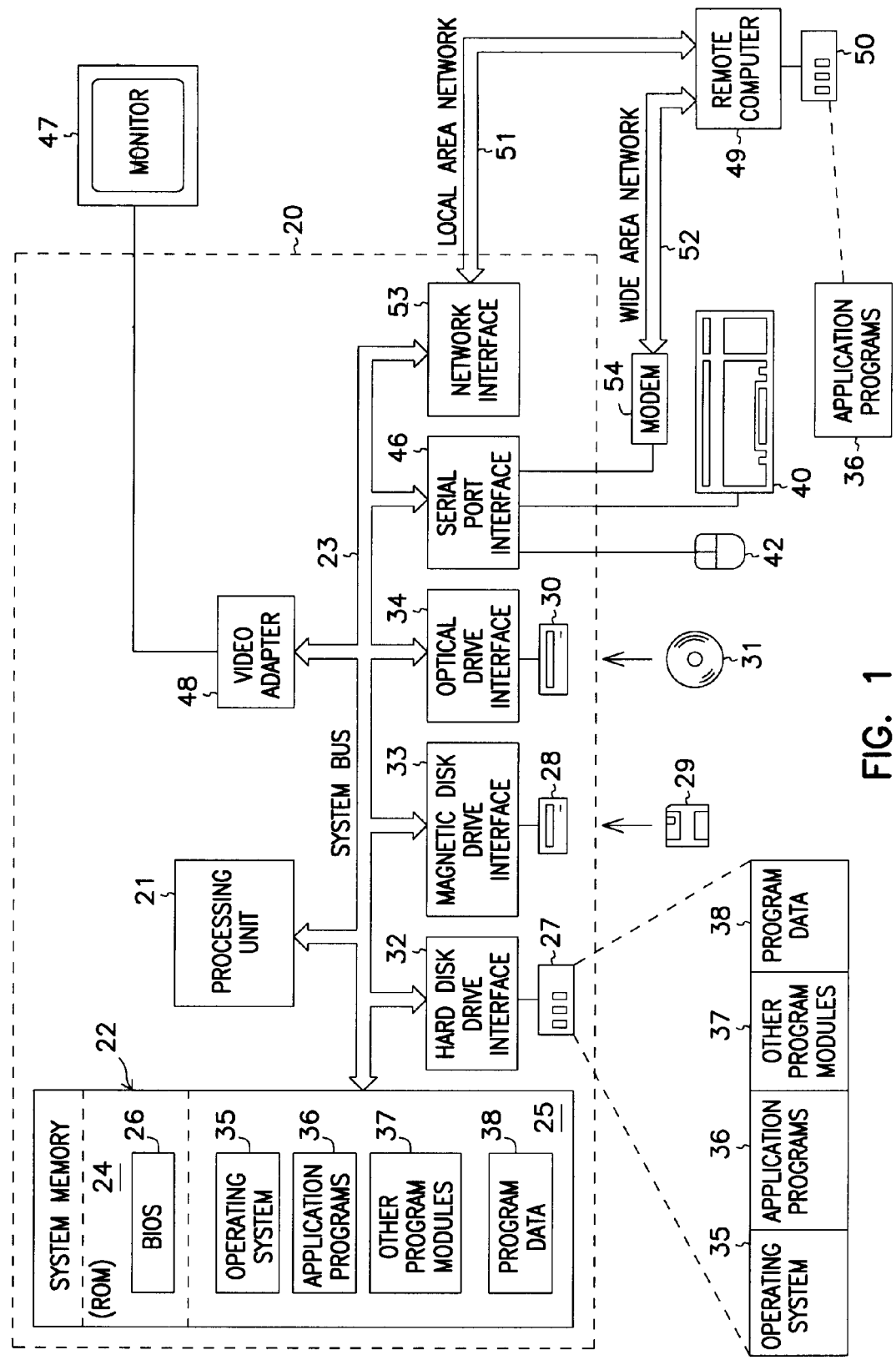
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Effects of Skew and Low Selectivity

The effects of skew and low selectivity can adversely affect the accuracy of sampling-based estimations.

The following example demonstrates the adverse impact of skew on the applicability of sampling.

EXAMPLE 1

Suppose there are 10,000 tuples of which 99% have value 1 in the aggregate column, while the remaining 1% of the tuples have value 1000. Consider using a uniform random sample of size 100 to estimate the average value of the column over all tuples. It is quite likely that the sample would not include any tuple of value 1000, leading to an estimate of 1 for the average value. On the other hand, if perchance two or more tuples of value 1000 were to be included in the sample, then the estimate of the average value would be more than 20.98. In either case, the estimate would be far from the true value of the average which is 10.99. It is only in the case where there is exactly one tuple of value 1000 in the sample that we would obtain a reasonable estimate of the average value. But the latter event has probability only 0.37. Therefore, with high probability a large error in the estimate would result.

In this example it is observed that a skewed database is characterized by the existence of certain tuples that are deviant from the rest with respect to their contribution to the aggregate value. These tuples are referred to as "outliers."

The presence of outliers causes a large "variation" in the aggregate values which is directly proportional to the standard error in sampling as demonstrated by the following theorem. The theorem quantifies the error for estimating aggregate queries that calculate sum or average of values defined over the tuples. The value associated with a tuple could be a function of one or more of its attributes (columns). For example, if the query is select sum (quantity*price) from lineitem then the function f(t) over the tuples is f(t)=t.quantity*t.price.

Theorem 1. Consider a relation of size N and let $\{y_1, y_2, \ldots, y_N\}$ be the set of values associated with the tuples in the relation. Let U be a uniform random sample of the $y_i$'s of size n. Then the sample mean $\overline{y}=1/n\Sigma_{y_i \in U} y_i$ is an unbiased estimator of the actual mean $\overline{Y}=1/N\Sigma_{i=1}^{N} y_1$ with a standard error of $$\epsilon = \frac{S}{\sqrt{n}} \sqrt{1 - \frac{n}{N}} \text{ where} \qquad (1)$$

$$S = \sqrt{\frac{\sum_{i=1}^{N}(y_i - \overline{Y})^2}{N-1}}$$

If there are outliers in the data then the quantity S is very large, in which case the sample size n should be increased to meet the error bounds. For instance, consider two sets of values each containing N elements. Let S and 2S be the variance of the two sets. If a sample size of n is sufficient to ensure error bounds for the first set, a sample size 4n is required to provide the same guarantees for the second set. In general, the sample size would have to increase quadratically with the variance thereby hampering the efficiency gained from sampling. Earlier works assume that the aggregate attributes are not skewed.

Since most queries involve selection conditions and/or Group-By's, it is important to study their interaction with sampling. If the selectivity of a query is low, then it dramatically and adversely impacts the accuracy of sampling-based estimation. A selection query partitions the relation into two sub-relations: tuples that satisfy the condition (relevant sub-relation) and those which do not. With sampling uniformly from the relation, the number of tuples that are sampled from the relevant sub-relation is proportional to its size. If this number is small (low selectivity), very small relevant sample size is obtained, leading to large error. Consider the standard error ($\epsilon$) in uniform sampling as given by Theorem (1). If n is the sample size for the entire relation and q is the selectivity of the query, then the expected number of samples that satisfy the selection condition is given by qn. Since the error is inversely proportional to $\sqrt{qn}$, a low selectivity q will give rise to large error due to sampling. The same is true for Group-By queries which partition the relation into numerous sub-relations (tuples that belong to a specific group). The main point to note is that for uniform sampling to perform well, the importance of a sub-relation should be reflected by its size, which is not the case in general.

Use of Outlier Indexes to Approximate Aggregate Queries

Figure 2:
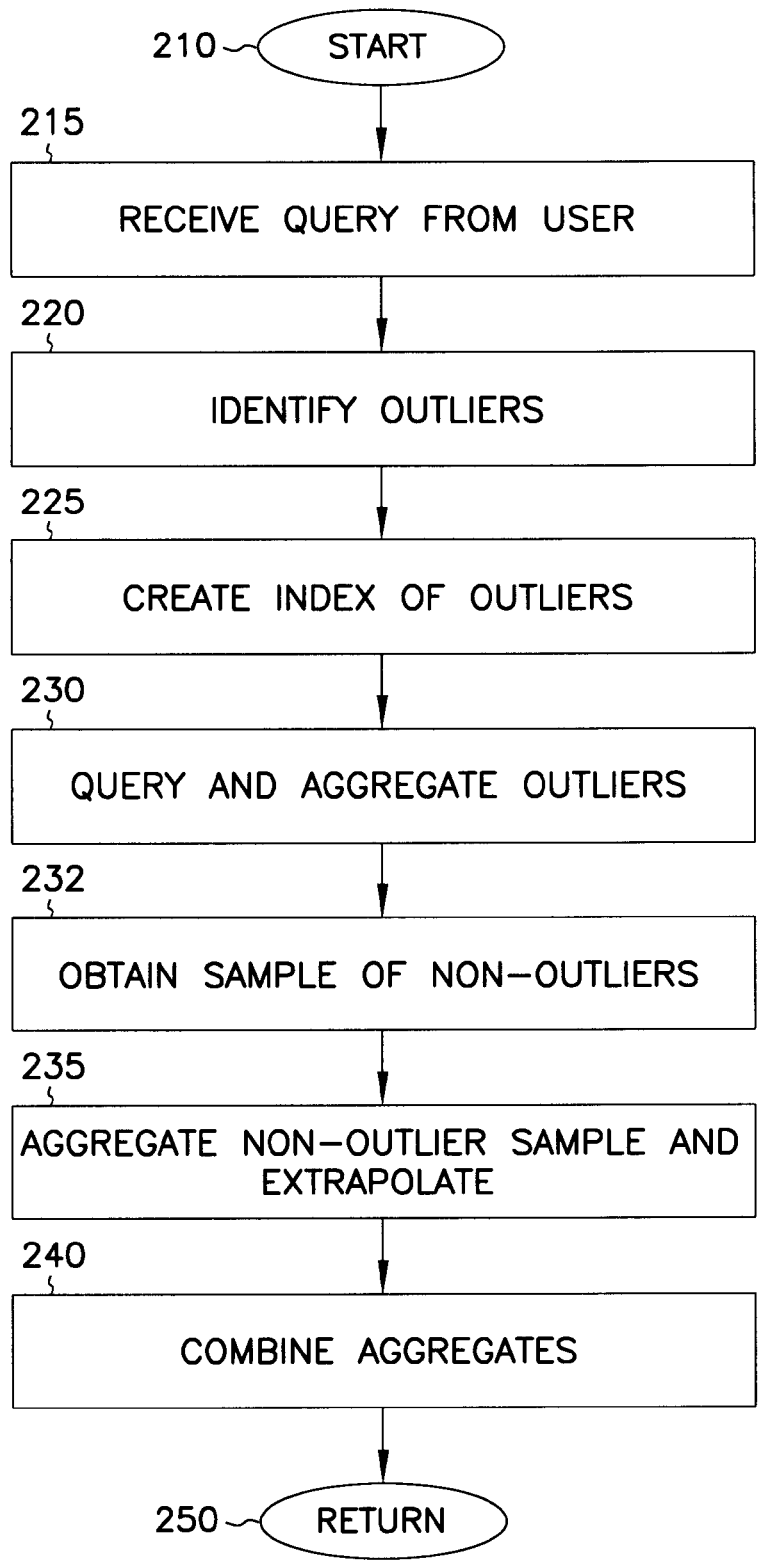
FIG. 2 is a flowchart of a sampling process taking outliers into account.

As indicated above, datasets may contain outlier values, which are values that occur with low frequency, but have a high contribution to an aggregate of the data being computed. Uniform random sampling is not sufficient to provide an accurate estimate of the aggregate when the data being sampled contains such outliers. An improved technique accounts for such outliers in combination with sampling of the data. A high level simplified flowchart of the steps involved is shown in FIG. 2. The functions described in this and other flowcharts may be represented in a computer program stored on a computer readable medium and performed on the computer system of FIG. 1. The computer readable medium may also comprise carrier waves for transmitting the program between computers and various storage medium.

In FIG. 2, processing starts at 210. A query is received from a user at 210 and outliers are identified from the data to which the query is directed at 220, and as further described with respect to FIGS. 3 and 4. The outliers identified are then indexed at 225. It should be noted that the identification of outliers and indexing of them is normally performed prior to receipt of queries, but may also be performed prior to the query being received. This greatly speeds up the processing of the query, which in many cases is real time, with a user waiting for results.

Following creation of the index of outliers at 225, the outliers are then subjected to the query and aggregated at 230. This provides an outlier aggregate, such as a sum of all the outliers meeting the query criteria. A sample is obtained at 232. It may be obtained in many different ways, such as during a preprocessing phase prior to execution of the query. Next, the outliers are removed from the data at 235. Such data is then sampled, subjected to the query, and aggregated. The result of this is extrapolated based on the frequency of the sampling and the total number of non-outliers to provide an estimated aggregate. The estimated sum is combined with the outlier aggregate to provide an estimate of the aggregate of the entire dataset at 240, and control is returned at 250.

The overall process of FIG. 2 is now described in further detail. Given a query Q which aggregates over column C of relation R, an existing "outlier index" for C is used along with a uniform sample of R to approximately answer Q. An "outlier index" $R_O$ may be thought of as a sub-relation of the original relation R.

The table R is partitioned into two subtables $R_O$ (outliers) and $R_{NO}$ (non-outliers), i.e., $R_O$ is the set of tuples that belong to the outlier index. An aggregation query Q can be considered as the "union" of two sub-queries, the first of which is Q applied to the $R_O$, while the second is Q applied to the $R_{NO}$. This leads to the following scheme for approximately answering an aggregate query for a given choice of the outliers $R_O$. To illustrate the scheme, the example query—select sum(sales) from lineitem is used.

1. Determine Outliers—specify the sub-relation $R_O$ of the tuples deemed to be the outliers and create an index (the outlier index) for these tuples. In the example, a view called lineitem_outlier is created, which will be appropriately indexed.

2. Sample Non-Outliers—select a uniform random sample S' of the relation R. Remove any tuples from $R_O$ that are in S' to obtain a sample S of $R_{NO}$. In the example, the lineitem table is sampled, any tuples from the sample that are part of lineitem_outlier are removed, and the remaining tuples in the sample are materialized in a sample table called lineitem_samp.

3. Aggregate Outliers—apply the query to the outliers in $R_O$ accessed via the outlier index. In the example, this corresponds to computing sum(sales) for the view lineitem_outlier.

4. Aggregate Non-Outliers—apply the query to the sample S and extrapolate to obtain an estimate of the query result for $R_{NO}$. In the example, this corresponds to computing sum(sales) for the table lineitem_samp and then multiplying the result by the inverse of the sampling fraction (extrapolation).

5. Combine Aggregates—combine the approximate result for $R_{NO}$ with the exact one for $R_O$ to obtain an approximate result for R. In the example, this means adding sum(sales) for the view lineitem_outlier to the extrapolated sum(sales) for lineitem_samp.

It should be noted that 1 and 2 above are preprocessing steps and are executed once, while the remaining steps are online and are executed for each query. In 5, the approximate result for $R_{NO}$ is combined with the result for $R_O$ to obtain an approximate result for R. This requires that the aggregate function have the following property: Let f be a function defined over a multiset of values. If f(X) and f(Y) are the function values over the multisets X and Y respectively, then f(X∪Y) may be calculated without "looking" at the multiset (X∪Y), using only f(X), f(Y), and possibly some simple statistics like |X| and |Y| over the multisets. Aggregate functions like sum and avg have this property. Although the basic framework of outlier indexing can be applied to any function f that satisfies the above constraint, identifying the sub-relation for outlier indexes is dependent on the specifics of f.

Figure 3:
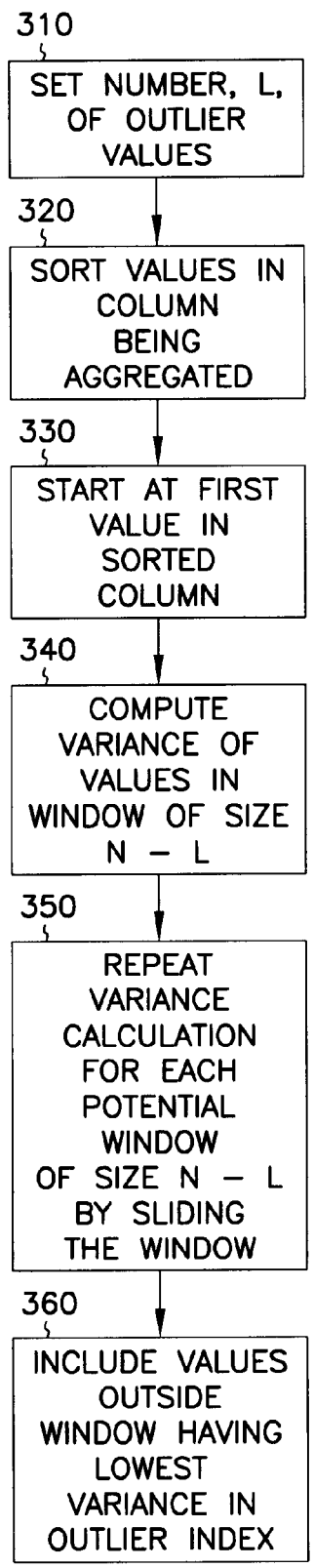
FIG. 3 is a flowchart of an outlier identification algorithm.

A simplified overview of the manner in which outlier values are selected is shown in FIG. 3. Starting at 310, a threshold, L, for the number of tuples or rows of a dataset are determined. This threshold may be determined based on the availability of system resources that can be dedicated to improving the accuracy of an estimated aggregation, and can also be based on a desired accuracy of the estimation. The threshold is basically the number of outlier values which can be taken into account, and may be set by a database system administrator. Further detail is provided in the alternative embodiments section.

Given the threshold, values in a column being aggregated are sorted at 320. L corresponds to the number of values, which may be equal to the number of tuples in the database if there are no selection conditions. The values are sorted in ascending or descending order using any available sorting algorithm. Once the values have been sorted, an index of outlier values is created. A sliding window is employed to identify sets of outliers. In other words, the window is of size N−L, and is slid along the column of values, starting at the first value in block 330. At this point, the first N−L values are situated within the window, and the last L values are outside of the window. A variance of such values is calculated at 340. The window is then moved down one value in the sorted list, such that the first value is no longer in the window. Since the window is a constant size in one embodiment, L−1 values at the high end of the list are now excluded from the window. As the window is slid one value at a time, the variance of the values within each window of size N−L is determined at 350. The variance is determined in one embodiment by maintaining it for a dynamic set of numbers subject to insertions and deletions. Moving the window one value results in both an insertion and deletion rather than a recalculation of the variance using all the numbers in the set or window.

The index is created by identifying the window having the lowest variance, and including all values outside of the window in the outlier index at 360. Several variations of the above are possible, including sliding the window more than one value at a time. In one embodiment, the window moves multiple values between calculations of the variance. In this embodiment, once the low variance window is determined, the window may be repositioned one value at a time about such low variance window and the variance at each window calculated. Again the window with the low variance is selected and outliers thus identified. In still further embodiments, it is recognized that once a lowest variance is encountered, and the variance keeps increasing, one may stop sliding the window and select the window with the lowest variance already calculated.

Figure 4:
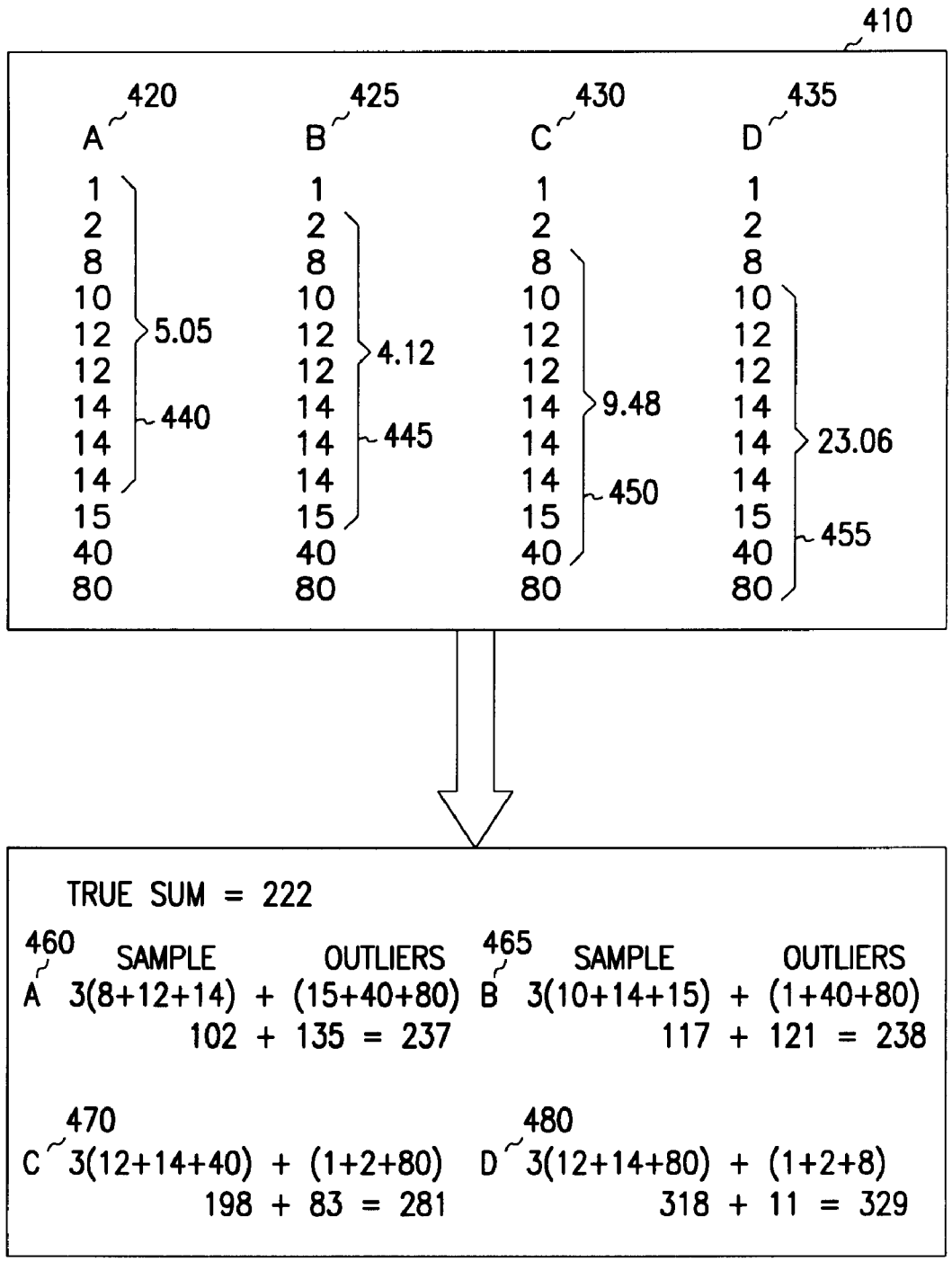
FIG. 4 is a graphic representation of windows used in the algorithm of FIG. 3.

A simple example of selecting the outlier values and finding the estimated aggregate is described with respect to FIG. 4. Twelve values are shown, corresponding to twelve tuples in a database. The values are shown four times, in columns 420, 425, 430 and 435. A window is also shown in each column, identifying nine entries in each column. The windows are slid down each column, such that the first window 440 includes the first nine values. The second window 445 covers values two through 10, the third window covers values three through eleven, and the fourth window covers values four through twelve. Each window is shown with a variance corresponding to the variance of the values in the window. The variance of column 425 is lowest, and defines the values to be sampled. In this example, every third value is included in the sample, and there is memory allocated to three outliers.

Further, in this example, the sum of the column of values is the desired aggregate. The actual sum is easily seen to be two hundred twenty two. To estimate the sum in accordance with the invention, the sum of the outliers, corresponding to values one, forty, and eighty is one hundred twenty one. Every third sample of the values in the window 445, include the values ten, fourteen and fifteen. The sum of these samples must be multiplied by the inverse of the sample rate, or three, yielding a sum of one hundred seventeen, for a total estimated sum of two hundred thirty eight, as shown at 465. Estimated sums for the other window positions are also shown at 460, 470 and 480. It should be noted that this example is only for illustration of the operation of the invention, and is not actually a good candidate for estimation, since the total number of values is extremely small. In fact, column 460 provides a slightly better estimate, even though the variance of the data in the window was slightly higher than that of window 445. However, the variance of windows 450 and 455 was significantly higher, as were the estimated sums using such windows.

Detail of Identifying Outlier Values

Further detail is now provided with respect to identifying the outlier values and constructing outlier indexes.

This section describes further detail in selection of outliers where the aggregation is a sum. Since the relative error in estimating the average is the same as that for sum, the choice of outliers does not change when the aggregation is average.

There are two points to be observed: (1) the query error is due to the error in estimating the aggregate of the non-outliers from their sample and (2) there is an extra cost (above that incurred by pure sampling) due to the need for maintaining and accessing the outlier index. Therefore, outlier set $R_O$ is selected to minimize the approximation error for a class of queries subject to the constraint that $R_O$ contains at most τ tuples from the relation R. The following definition identifies an optimal choice of the outlier set $R_O$.

Definition 1. For any sub-relation $R' \subset R$, let $\epsilon(R')$ be the standard error in estimating $\Sigma_{t \in R \setminus R'} t.C$ using random sampling followed by extrapolation. An optimal outlier set $R_O(R, C, \tau)$ for a column C in a relation R with a threshold $\tau$ is defined as a sub-relation $R_O \subset R$ such that $|R_O| \leq \tau$, and $\epsilon(R_O) = \min_{R' \subset R ||R'| \leq \tau} \{\epsilon(R')\}$.

Essentially the outlier index is defined as an optimal sub-relation $R_O$ that leads to the minimum possible sampling error, subject to the constraint that $R_O$ has at most $\tau$ tuples in the relation R. The sampling error is the error in estimating the aggregate value over the tuples not included in $R_O$ using the standard sample-and-extrapolate strategy. The error is directly proportional to the variance S given by $$S = \sqrt{\frac{\sum_{i=1}^{N}(y_i - \overline{Y})^2}{N-1}}.$$

Let $S(R')$ be the variance for any sub-relation $R' \subset R$. Then an outlier index $R_O$ is a sub-relation of size at most $\tau$ such that the complement $R \setminus R_O$ sub-relation has minimum variance $S(R \setminus R_O)$. The following theorem assists in choosing such a sub-relation efficiently.

Theorem 2. For any multiset $A = (y_1, y_2, \ldots, y_n)$ let the variance $S(A)$ be defined as $$S = \sqrt{\frac{\sum_{i=1}^{N}(y_1 - \overline{Y})^2}{N-1}}$$

where $\overline{Y} = 1/N \Sigma_{i=1}^{N} y_i$ is the mean of the multiset. Consider a multiset $R = \{y_1, y_2, \ldots, y_N\}$ where the $y_i$'s are in sorted order. Let $R_O \subset R$ be the subset such that $|R_O| \leq \tau$, and $S(R \setminus R_O) = \min_{R' \subset R ||R'| \leq \tau} \{S(R \setminus R')\}$.

then $R_O = \{y_1, y_2, \ldots, y_{\tau'}, y_{N-\tau+\tau'+1}, \ldots, y_N\}$ for some $0 \leq \tau' \leq \tau$.

The theorem states that the subset that minimizes the variance over the remaining set consists of the leftmost $\tau'$ elements (for some $0 \leq \tau' \leq \tau$) and the rightmost $\tau - \tau'$ elements from the original multiset, when the elements are arranged in a sorted order. Thus, the selection of an outlier index simplifies to finding the value $\tau'$. This gives rise to the following algorithm for outlier index selection, which follows the flowchart of FIG. 3.

Algorithm Outlier-Index (R, C, $\tau$):

1. Read the values in column C of the relation R. Let $y_1, y_2, \ldots, y_N$ be the sorted order of the values appearing in column C. Each value corresponds to a tuple (320).

2. For $i=1$ to $\tau$, compute $E(i) = S(\{y_i, y_{i+1}, \ldots, y_{N-\tau+i-1}\})$, where S is the variance of the multiset as defined in Theorem 2 (350).

3. Let $\tau'$ be the index where E(i) takes its minimum value. Then, the outlier index is the tuples that correspond to the set of values $\{y_1, y_2, \ldots, y_{\tau'-1}, y_{N-\tau+\tau'}, y_{N-\tau+\tau'}, \ldots, y_N\}$ (360).

The efficiency of the algorithm crucially depends on the ability to compute variance efficiently. We show how this can be done in linear time, once the values in column C have been sorted. It is well known that quantities such as sum, mean, variance, etc. can be efficiently maintained for a dynamic set of numbers subject to insertions and deletions. In particular, each insertion or deletion can be handled in O(1) time. In implementing Step 2, we start by scanning the data to compute E(1). We also make memory-resident copies of the first $\tau$ and the last $\tau$ values of $(y_1, y_2, \ldots, y_N)$. (If they cannot fit into memory we make copies on disk, however $\tau$ is usually small). After this we do not have to scan the data any more. This is because E(i+1) can be incrementally computed from E(i) since the value to be deleted ($y_i$) and the value to be inserted ($y_{N-\tau+i}$) can be looked up from the copies. Thus, the running time of the algorithm is dominated by the sorting in Step 1.

Multiple aggregates may be handled by maintaining an outlier index for each aggregate. However, outlier indexes for different aggregates are likely correlated, and as a result have many tuples in common (a tuple that is outlier for a certain column or aggregate may also be an outlier for other aggregates). Hence, an optimization heuristic is to maintain the union of these indexes. A more precise analysis partitions the available memory space among outlier indexes for multiple aggregates in a judicious manner that takes into account their relative importance, e.g., by exploiting workload information.

Given sufficient space to store T tuples, the allocation of memory between samples and outlier index should be done in a manner that minimizes error.

Let S(n) denote the variance in the non-outliers for an optimal outlier index of size n. If we allocate the space such that we have n tuples in the outlier index and T−n tuples in the sample, then the error as given by equation 1 is proportional to $S(n)/\sqrt{T-n}$. Since the function S(n) does not have a closed-form formula and depends on the data distribution, identifying an optimal allocation would require evaluating S(n) for a set of evenly-spaced values of n from 0 to T; finding the value of n ($n_0$) for which $S(n)/\sqrt{T-n}$ is minimized and distributing the memory as $n_o$ tuples in the outlier index and T−$n_o$ tuples in the sample.

Extensions to Other Aggregates. We have described a procedure for selecting outliers for the case of sum and avg. Suppose we want to aggregate (sum or average of) f(t), where f is a real valued function defined over the tuples. Then, we can use the function values instead of $y_i$'s in our algorithm and can determine the sub-relation that minimizes the variance over the remaining set. One should note that f(t)=1 for the count aggregate and in this case there is no variance in the values. In other words, outlier indexing is not required for count aggregates and uniform sampling works well. It is easy to see that if the function is linear in $y_i$'s (i.e., f(t)=$ay_i$+b), then the same set of tuples that minimize the variance for $y_i$'s minimize the variance for f(t)'s and hence the outlier index defined for $y_i$'s can be used. It is well known that uniform sampling works well for estimating the median. On the other hand sampling does not work well for min (and max) queries since intuitively, the min value may be much smaller than the next smallest value, and therefore our estimate of min can be arbitrarily bad unless we happened to obtain the min value in the sample itself. However, we can use sampling to return a value that is not too far away from the min or max in terms of the rank ordering, i.e., we can use sampling to return a value which, while not the minimum, would be guaranteed to be among the k smallest values for some small k; of course, the kth smallest value may be significantly different from the smallest value.

Exploiting Workload Information for Sampling

The sliding window approach was described above for use in estimating aggregation queries where data skew existed. In this section, workload information is leveraged for estimating aggregation queries having low selectivity. The workload information is used both in obtaining the sample, and in creating the outlier index. By tuning the sample and outlier index to a representative workload (i.e., set of queries), the queries can be estimated more effectively.

Figure 5:
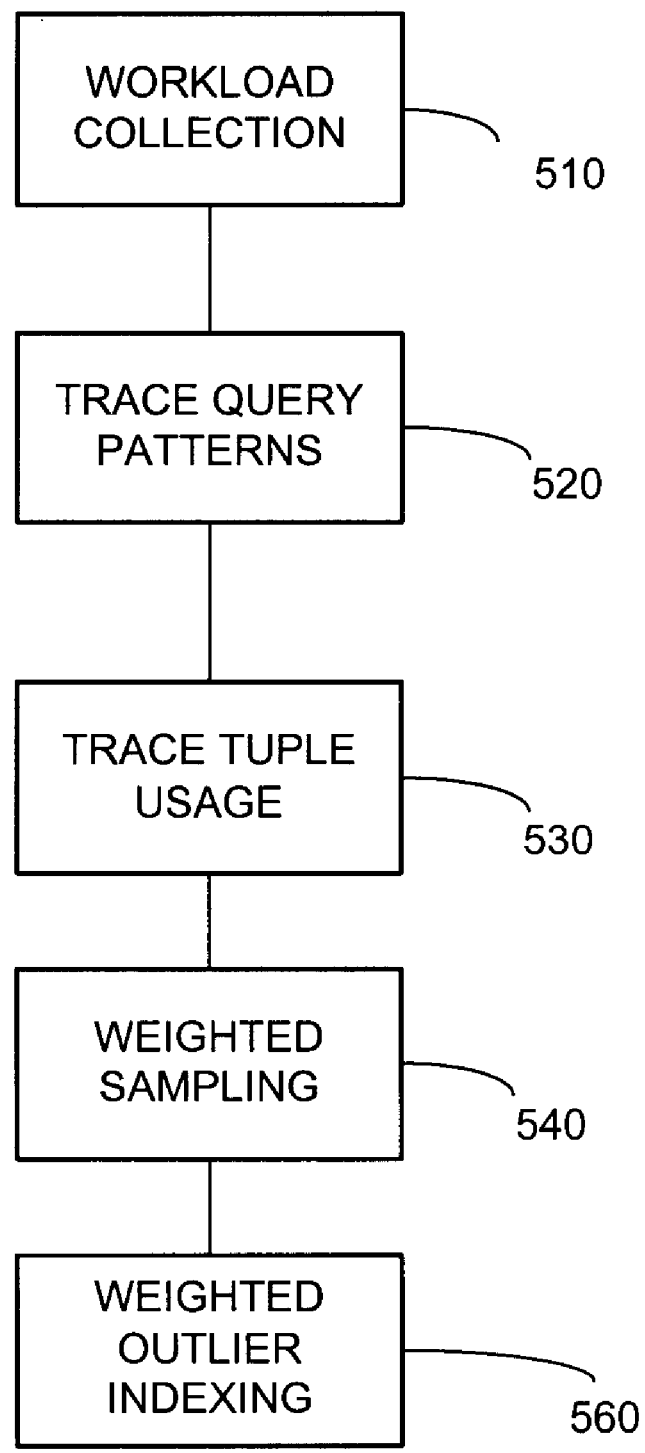
FIG. 5 is a flowchart of the use workload information in the context of weighted sampling.

The use of workload information for sampling and outlier indexing involves the following steps as shown in the flowchart of FIG. 5:

1. Workload Collection 510: Obtain a workload representative of the queries posed against the database. Modern database systems provide tools to log queries posed against the server (e.g., the Profiler component of Microsoft SQL Server).

2. Trace Query Patterns 520: The workload can be analyzed to obtain parsed information, e.g., the set of selection conditions that are posed.

3. Trace Tuple Usage 530: The execution of the workload reveals additional information on usage of specific tuples, e.g., frequency of access to each tuple, the number of queries in the workload for which it passes the selection condition of the query. Since tracking this information at the level of tuples can be expensive, it can be kept at coarser granularity, e.g., on a page-level. Alternatively, batching of updates can be used to lower this overhead.

4. Weighted Sampling 540: Perform sampling by taking into account weights of the tuples (from 530).

5. Weighted Outlier Indexing 550: Identify an outlier index that captures outliers in popular queries using query pattern analysis (from 540).

In principle, the precomputed uniform sample for the entire relation can be used to derive a sample for each sub-relation created by a selection condition or a group-by. However, unlike the case where aggregation is done over the entire relation in which there was exact control on the sample size, in the current case direct sampling is not done from the sub-relation. Instead, sampling is done from the entire relation and then the selection filter is applied to the sampled tuples. If q is the selectivity, for a sample of size n, the effective sample for the sub-relation would be of expected size nq but may differ from this expectation. To guarantee that with high probability at least nq tuples are sampled from the sub-relation, slightly more than n tuples are sampled from the relation. In the following discussion this notion of "slightly" is quantified. Note that the discussion is valid for the case of group-by queries too, where the selectivity for a group is defined as the ratio $N_g/N$, where $N_g$ is the number of tuples that belong to the group and N is the number of tuples in the relation.

Consider a group that has very few tuples, say $N_g$. Suppose each tuple with probability p is sampled, leading to an expected sample size of $N_p$. From Chernoff bounds, it is guaranteed that the actual number of tuples that are sampled from the group is at least $(1-\delta)N_g p$ (the expected value is $N_g p$) with confidence at least $1-\gamma$ from some $0<\gamma, \delta<1$, provided $N_g p$ is sufficiently large. Since the sampling fractions is fixed, this requires that $N_g$ be large. Therefore, it cannot be guaranteed that the small groups are represented sufficiently in the sample. Hence, only guarantees for the big groups are provided. Workload information can also be leveraged for the case of small groups as described below. If the selection (similar results are valid for group-bys) condition is independent of the aggregate column and if the selectivity is not too small, then uniform sampling works well, otherwise weighted sampling is used.

Exploiting Weighted Samples

Figure 6:
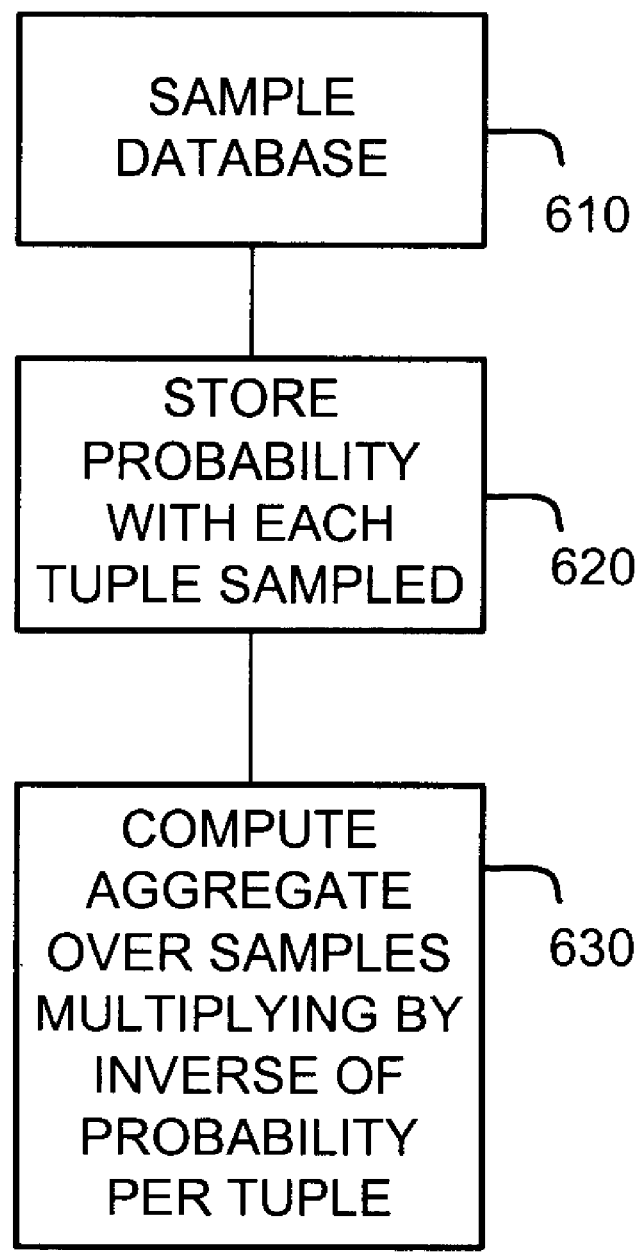
FIG. 6 is a flowchart of the collection of weights for multiple sub-relations given a query with low selectivity.

With weighted sampling, sampling is performed more from groups which though small in size, are important, i.e., have high usage. Usage of a database is typically characterized by considerable locality in the access pattern. Queries against the database access certain parts of the data more than others. Normalizing the aggregate when weights are associated with tuples is more complex since there is no single sampling fraction. With each tuple that is included in the sample 610 in FIG. 6, the probability with which it was accepted in the sample is associated or stored at 620. The inverse of this probability is the multiplication factor associated with the tuple. This essentially says that if a tuple was included with probability p then it is a representative of 1/p similar tuples. Each aggregate computed over this tuple is multiplied by this multiplication factor at 630. In the (degenerate) case of uniform sampling since the probability is the same for each tuple the multiplication factor is the same for all the tuples.

Weighted sampling works well if (a) the access pattern of queries is local (most of the queries access a small part of the relation) and (b) the workload is a good representation of the actual queries which will be asked in future. To quantify the benefit of workload-driven weighted sampling, let G be the set of tuples accessed by a query Q. If the query Q is such that the average weight of a tuple in G is significantly higher than the overall average weight, then the effective sampling fraction is much higher for this query as compared to the overall sampling rate. This is quantified in the following lemma.

Consider a relation R (fact table). Let Q denote the subset of tuples from R that are accessed (satisfy the selection condition) by some query. Let $w_Q$ denote the average weight of a tuple in Q, and w denote the average weight of all tuples in R. Using weighted sampling with an overall sampling fraction p, the effective sampling fraction for the query equals $pw_Q/w$.

Thus, weighted sampling gives better accuracy for queries which access tuples that have higher weights (high $w_Q/w$ ratio). As a result, better accuracy is obtained through effectively doing more sampling although the execution time remains the same since the sample size for the fact table is the same as in the case of uniform sampling. In other words the sample contains more tuples that are pertinent to the query and less of the sampled tuples are thrown away (do not pass the selection condition).

Selecting Outlier Indexes According to Workload

A query with selection or group-by implicitly defines one or more sub-relations over which aggregates are computed. The set of outliers for the sub-relation produced by a selection condition may be completely different from the outliers for the entire relation (global outliers). In fact, they may not even belong to the set of global outliers. Ideally, in such situations, we would like to have an outlier index for each possible sub-relation in order to answer aggregate queries pertaining to it, but that would be prohibitively expensive.

Consider the case where the selection condition (or group-by) is independent of the column that is being aggregated. In that case, one would expect that tuples that are outliers in the sub-relation(s) created by the selection or the group-by are outliers for the entire relation too and are a part of the global outlier index. Therefore, applying the selection condition to the global outlier index will yield an outlier index for the sub-relation. However, the independence assumption need not be valid in many situations. In fact, the independence assumption is less likely to be valid whenever the sub-relation size is small, e.g., when a condition or a group has low selectivity, or a range query on the aggregate column itself. We outline an approach that exploits workload information to define an outlier index that can cope in the absence of the independence assumption.

If the independence assumption does not hold, we are left with no choice but to index the outliers for each sub-relation and consolidate everything into a single global index. Since we cannot afford to make the outlier index too big, we have to ration the available space between different indexes corresponding to sub-relations. Let $\{R_1, R_2, \ldots, R_q\}$ be the (implicit) sub-relations corresponding to the different selection conditions and group-by's. If there is no selection or group-by, then the corresponding sub-relation is the entire relation. Let $\{w_1, w_2, \ldots, w_q\}$ be the weights (number of queries that queried the sub-relation) associated with these sub-relations for the given workload. Let T be the total available memory for building an outlier index. The problem is to ration T among the sub-relations for building indexes.

In this section we see how we can do this allocation among different sub-relations efficiently. It should be noted that the scheme that we present is based on heuristics.

Figure 7:
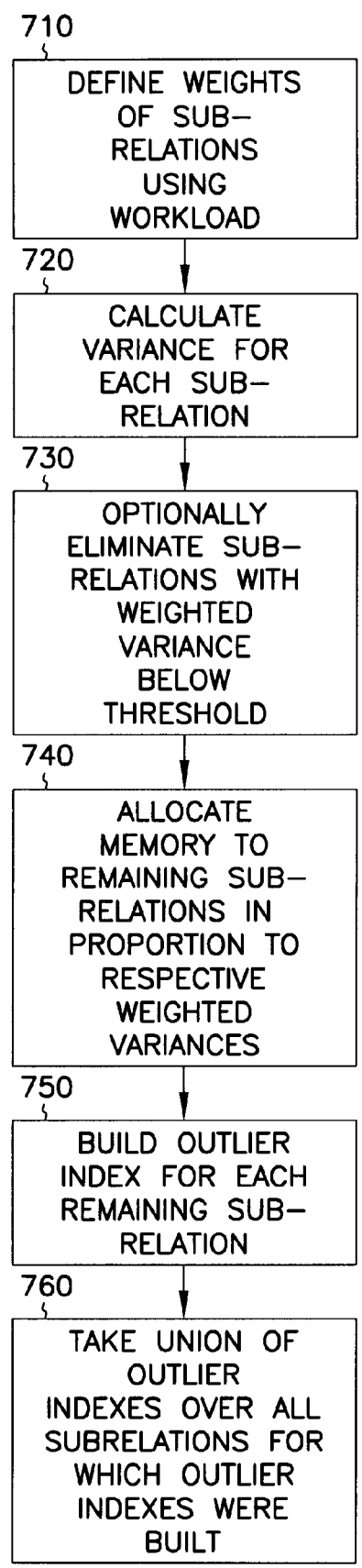
FIG. 7 is a flowchart of the generation of an outlier index for multiple sub-relations given a query with low selectivity.

To allocate the memory among the different sub-relations we propose the following steps as shown in FIG. 7:

1. Collect information about the different sub-relations $\{R_1, R_2, \ldots, R_q\}$ and their weights $\{w_1, w_2, \ldots, w_q\}$ using the workload (710).

2. For each sub-relation $R_i$ calculate the variance $S(R_i)$ in the aggregate column for that sub-relation. The error corresponding to this sub-relation is proportional to $S(R_i)$ (720).

3. Retain only those sub-relations for which the weighted variance $w_i S(R_i)$ is greater than a certain user-specified threshold. This step prunes out or eliminates those sub-relations for which the data distribution does not warrant an outlier index or those that are not queried often. In other words, they have a weighted variance below the threshold (730).

4. Allocate the given memory among all remaining sub-relations in proportion to their weighted variances ($w_i S(R_i)$) (740). Using this memory bound, build an outlier index for each sub-relation (750) and take the union of the outlier indexes over all sub-relations for which outlier indexes were built (760).

Several improvements to the basic scheme presented above are possible. For example, under certain circumstances it is possible to exploit overlap among sub-relations. However, the basic scheme suffers from the complication that the available memory allocated to outlier indexes may not be fully exploited. This would require having to repeat Steps 3 and 4 with lower user-specified threshold. In an alternative scheme, where it is possible to globally order the outliers, from the most significant to the least, and index them in this order until the available memory is fully used up.

Finally, we note that to build a robust system, we need a mechanism to decide for a given query whether our samples and outlier indexes are good enough (i.e., give acceptable error) for answering it. We suggest the following mechanism: We use the sample of the non-outliers to get an estimate of the variance in the aggregate values over the non-outliers in the sub-relation that is queried. Using this estimate and the number of samples of the non-outliers we can estimate the error using equation in Theorem 1. This error estimate can be used to decide, perhaps with user input, whether we should use the combination of samples and outlier index to answer the query or if we should answer it exactly using the data itself.

The aggregation of the outlier index is then combined with the sample to arrive at the overall estimate of the query as above.

Conclusion

Estimating aggregation queries is done by first identifying outlier values, aggregating the outlier values, and then sampling the remaining data after pruning the outlier values. The sampled data is extrapolated and added to the aggregated outlier values to provide an estimate for each aggregation query.

The use of outlier values combined with sampling provides the ability to use sampling-based estimations over data having skew in aggregate values, low selectivity or ad-hoc queries and where there are small groups in group-by queries with better accuracy, and without losing the benefits of sampling in reducing system resource requirements.

For queries having low selectivity or group by, weighted sampling is used, and may be combined with an outlier index based on weights of sub-relations. Sampling is performed on the entire relation, and then the aggregates are multiplied by the inverse of the probabilities associated with each sub-relation. The variance of each sub-relation is used to prune sub-relations, and the remaining sub-relations are used to calculate an outlier index for each one. The outlier indexes are then subjected to a union, to form a single outlier index. The aggregate from this single outlier index is then combined with the aggregate from the weighted sample to provide a final estimate of the aggregation.

This application is intended to cover any adaptations or variations of the present invention. It is manifestly intended that this invention be limited only by the claims and equivalents thereof. SQL was used to query the data and create indexes and sampling. Other forms of relational database query language and various programming languages could be used as known to those of skill in the art.

We claim:

1. A method that computes an approximate result to an aggregation query on a relation with at least one attribute comprising:

identifying outlier tuples in the relation having an attribute value that meets an outlier criteria that is a variance of the attribute value in each tuple with respect to the other tuples in the relation by:

sorting the tuples based on the tuple value for the attribute;

determining a minimum number of tuples to be classified as outliers;

determining a set of contiguous sorted tuples that includes at least the minimum number of tuples and for which the variance is minimized; and classifying tuples not in the set of contiguous sorted tuples as outliers;

executing the query on the identified outlier tuples to obtain an outlier result;

estimating a non-outlier contribution of non-outlier tuples to the result of the query; and combining the outlier result and the non-outlier contribution.

2. The method of claim 1 comprising constructing an outlier index that records a location of outlier tuples in the relation.

3. The method of claim 2 wherein the results of multiple queries are approximated and comprising maintaining a union of the outlier indexes.

4. The method of claim 1 wherein the non-outlier contribution is estimated by executing the query on a sample of the non-outlier tuples.

5. The method of claim 4 wherein the sample of non-outlier tuples is compiled by performing a random sample of the non-outlier tuples.

6. The method of claim 4 wherein the sample of non-outliers is compiled by including a tuple in the sample based on a probability that the tuple has been accessed by a previous user query.

7. The method of claim 1 wherein the outlier criteria is based on a type of query that generates the result being approximated.

8. The method of claim 1 wherein the variance is determined by calculating a standard deviation of the set of contiguous sorted tuples.

9. The method of claim 1 comprising estimating an error associated with the approximated query result and executing the query on the relation when the estimated error is above a predetermined threshold.

10. The method of claim 1 wherein the query divides the relation into sub-relations and wherein outlier tuples are identified for each sub-relation.

11. The method of claim 10 comprising constructing an outlier index for each sub-relation that records a location of outlier tuples in the relation.

12. The method of claim 11 comprising calculating a variance for the attribute values for the tuples in each sub-relation and wherein outlier indexes are stored for those sub-relations having a variance above a threshold variance.

13. A method for computing an approximate result to an aggregation query on a relation with at least one attribute comprising:
    analyzing the workload to trace tuple usage by queries in the workload;
    identifying outlier tuples in the relation having an attribute value that meets an outlier criteria;
    estimating a non-outlier contribution of non-outlier tuples to the result of the query by executing the query on a sample of non-outlier tuples that is weighted based on tuple usage;
    executing the query on the identified outlier tuples to obtain an outlier result by accessing an index of outlier tuples that have a relatively high tuple usage; and
    combining the outlier result and the non-outlier contribution.

14. A computer readable medium comprising computer executable instructions for performing a method that approximates a result to an aggregation query on a relation with at least one attribute comprising:
    identifying outlier tuples in the relation having an attribute value that meets an outlier criteria that is a variance of the attribute value in each tuple with respect to the other tuples in the relation by:
        sorting the tuples based on the tuple value for the attribute;
        determining a minimum number of tuples to be classified as outliers;
        determining a set of contiguous sorted tuples that includes at least the minimum number of tuples and for which the variance is minimized; and
        classifying tuples not in the set of contiguous sorted tuples as outliers;
    executing the query on the identified outlier tuples to obtain an outlier result;
    estimating a non-outlier contribution of non-outlier tuples to the result of the query; and
    combining the outlier result and the non-outlier contribution.

15. The computer readable medium of claim 14 comprising constructing an outlier index that records a location of outlier tuples in the relation.

16. The computer readable medium of claim 14 wherein the contribution of non-outlier tuples to the result of the query is estimated by executing the query on a sample of the non-outlier tuples.

17. The computer readable medium of claim 16 wherein the sample of non-outlier tuples is compiled by performing a random sample of the non-outlier tuples.

18. The computer readable medium of claim 16 wherein the sample of non-outlier tuples is compiled by including a tuple in the sample based on a probability that the tuple has been accessed by a previous user query.

19. The computer readable medium of claim 14 wherein the variance is determined by calculating a standard deviation of the set of contiguous sorted tuples.

20. The computer readable medium of claim 14 wherein the query divides the relation into sub-relations and wherein outlier tuples are selected for each sub-relation.

21. A computer readable medium comprising computer executable instructions for performing a method for approximating a result to an aggregation query on a relation with at least one attribute comprising:
    analyzing the workload to trace tuple usage by queries in the workload;
    identifying outlier tuples in the relation having an attribute value that meets an outlier criteria;
    estimating a non-outlier contribution of non-outlier tuples to the result of the query by executing the query on a sample of non-outlier tuples that is weighted based on tuple usage;
    executing the query on the identified outlier tuples to obtain an outlier result by accessing an index of outlier tuples that have a relatively high tuple usage; and
    combining the outlier result and the non-outlier contribution.

22. A system for computing an approximate result to an aggregation query on a database comprising:
    one or more computers that store data that is organized according to a hierarchy of related fields in one or more relations;
    a database management system including a processor that selectively extracts tuples from the database relations and including processor components that evaluate the contents of the tuples; and
    the processor comprising a query result approximation component comprising i) an outlier identification module that identifies outlier tuples that have an attribute value that meets an outlier criteria; wherein the outlier identification module sorts the tuples based on the tuple value for the attribute, determines a minimum number of tuples to be classified as outliers; determines a set of contiguous sorted tuples that includes at least the minimum number of tuples and from which the variance is minimized, and classifies the tuples not in the set of contiguous sorted tuples as outliers; ii) an outlier query execution module that executes the query on the identified outlier tuples; iii) a non-outlier query contribution module that estimates the contribution of the non-outlier tuples to the result of the query by executing the query on a sample of non-outlier tuples; and iv) a result aggregation module that combines a result of the query executed on the outlier tuples and the estimated result.

23. The system of claim 22 wherein the outlier identification module comprises an index that stores a location for each identified outlier tuple.

24. The system of claim 22 wherein the outlier identification module identifies outliers by determining the variance of the value of the attribute of a given tuple with respect to the other tuples in the relation.

25. The system of claim 22 wherein the non-outlier contribution estimation module accesses a sample of the non-outliers to estimate the contribution of non-outlier tuples to the result of the query.

26. The system of claim 25 wherein tuples are included in the sample based on a probability that the tuple has been accessed by a previous user query.

* * * * *